(12) United States Patent
Berkey et al.

(10) Patent No.: US 6,760,525 B2
(45) Date of Patent: Jul. 6, 2004

(54) CONTROLLED DISPERSION OPTICAL FIBER

(75) Inventors: George E. Berkey, Pine City, NY (US); Venkata A. Bhagavatula, Big Flats, NY (US); Lutfur Rahman, Ocean, NJ (US); Vaidyanathan Srikant, Evanston, IL (US)

(73) Assignee: Corning Incorporated, Corning, NY (US)

( * ) Notice: Subject to any disclaimer, the term of this patent is extended or adjusted under 35 U.S.C. 154(b) by 48 days.

(21) Appl. No.: 10/224,242

(22) Filed: Aug. 19, 2002

(65) Prior Publication Data

US 2003/0044148 A1 Mar. 6, 2003

Related U.S. Application Data

(60) Provisional application No. 60/314,216, filed on Aug. 22, 2001.

(51) Int. Cl.[7] .................................................. G02B 6/00
(52) U.S. Cl. ....................................... 385/123; 385/147
(58) Field of Search ................................. 385/123–129, 385/147

(56) References Cited

U.S. PATENT DOCUMENTS

| 5,504,829 | A |   | 4/1996 | Evans et al. ................. 385/123 |
| 5,854,871 | A |   | 12/1998 | Akasaka ....................... 385/123 |
| 6,188,823 | B1 |   | 2/2001 | Ma .............................. 385/123 |
| 6,430,347 | B1 | * | 8/2002 | Cain et al. .................... 385/123 |
| 2001/0008077 | A1 |   | 7/2001 | Berkey .......................... 65/403 |

FOREIGN PATENT DOCUMENTS

| WO |  | 0 959 374 | 11/1999 | ............ G02B/6/16 |
| WO |  | WO 00/16131 | 3/2000 |  |

OTHER PUBLICATIONS

Patent Abstracts of Japan, vol. 1997, No. 05, May 30, 1997 & JP 09 023187, Fujitsu Ltd., Jan. 1997.

Patent Abstracts of Japan, vol. 1998, No. 4, Mar. 31, 1998 & JP 09 318833, The Furukawa Electric Co. Ltd., Dec. 12, 1997 (See US 5,854,871 listed above).

Ainslie et al., "A review of single–mode fibers with modified dispersion characteristics", Journal of Lightwave Technology, Aug. 1986, vol. LT–4, No. 8, pp. 967–979.

Li et al., "Triple–Clad Single–Mode Fibers for Dispersion Shifting", Journal of Lightwave Technology, IEEE , New York, vol. 11, No. 11, Nov. 1, 1993, pp. 1812–1819.

* cited by examiner

*Primary Examiner*—Akm Enayet Ullah
(74) *Attorney, Agent, or Firm*—Joseph M. Homa; Randall S. Wayland

(57) ABSTRACT

Disclosed is a dispersion controlled optical waveguide fiber, and telecommunication systems using such a waveguide fiber, in which the end to end total dispersion and total dispersion slope is controlled by varying the refractive index profile along the fiber length. The waveguide fiber includes length portions each of which is characterized by total dispersion having a magnitude and sign and total dispersion slope having a magnitude and sign. The magnitudes and signs of total dispersion and total dispersion slope of respective length portions are chosen to provide for the optical waveguide fiber a desired end to end total dispersion and total dispersion slope. An advantage is achieved in the present invention by designing the refractive index profiles of the length portions to have total dispersion and total dispersion slope of opposite sign.

26 Claims, 12 Drawing Sheets

CONTROLLED DISPERSION OPTICAL FIBER

This application claims the benefit of and priority to U.S. Provisional Patent Application No. 60/314,216 filed Aug. 22, 2001.

BACKGROUND OF THE INVENTION

1. Field of the Invention

The invention is directed to an optical waveguide fiber for which total dispersion and total dispersion slope are controlled and more particularly to an optical waveguide fiber including length portions for which total dispersion is opposite in sign in to that of total dispersion slope.

2. Technical Background

Compensation of total dispersion is a protocol that was adopted early in the design of single channel high performance systems. To augment the beneficial effects of dispersion compensation for multi-channel wavelength division multiplexed systems, effectively extending the dispersion compensation over a desired operating wavelength band, the concept of dispersion slope compensation was introduced. Implementation of this concept has increased fiber span length between electronic regeneration modules in high performance systems into the range of hundreds of kilometers. System construction and maintenance cost has been significantly reduced.

Furthermore, to improve cable manufacturing efficiency and to reduce the cost of repair cable inventory, optical waveguide fibers were designed that compensated total dispersion within the length of a given waveguide fiber. This advance eliminated the need to select individual waveguide fibers, having particular values of total dispersion magnitude and sign, to achieve total dispersion compensation for a system.

In high data rate, long distance systems, it is desirable to compensate total dispersion slope within the waveguide fibers to allow for total dispersion compensation over a band of wavelengths, thus providing compensation for all wavelengths in wavelength division multiplexed systems.

Improvement in the properties of optical waveguide fibers are still being sought to further increase system capacity and to continue to reduce system cost. For example, it has been found that fiber lengths that exhibit negative total dispersion and negative total dispersion slope require the refractive index profile to exhibit a waveguide dispersion, which is a part of the total dispersion, having a steep waveguide dispersion slope. Such profiles tend to couple power into cladding modes and are sensitive to bend and micro-bend, all factors that reduce transmitted signal power. The profiles also are quite sensitive to ordinary manufacture variations. These and other problems are addressed by the present invention.

DEFINITIONS

The following definitions are in accord with common usage in the art.

The refractive index profile is the relationship between refractive index or relative refractive index and waveguide fiber radius.

A segmented core is one that is divided into at least a first and a second waveguide fiber core portion or segment. Each portion or segment is located along a particular radial length, is substantially symmetric about the waveguide fiber centerline, and has an associated refractive index profile.

The radii of the segments of the core are defined in terms of the respective refractive indexes at respective beginning and end points of the segments. The definitions of the radii used herein are set forth in the figures and the discussion thereof.

Total dispersion, sometimes called chromatic dispersion, of a waveguide fiber is the sum of the material dispersion, the waveguide dispersion, and the inter-modal dispersion. In the case of single mode waveguide fibers the inter-modal dispersion is zero.

The sign convention generally applied to the total dispersion is as follows. Total dispersion is said to be positive if shorter wavelength signals travel faster than longer wavelength signals in the waveguide. Conversely, in a negative total dispersion waveguide, signals of longer wavelength travel faster.

The effective area is $A_{eff} = 2\pi (\int E^2 r\, dr)^2 / (\int E^4 r\, dr)$, where the integration limits are 0 to $\infty$, and E is the electric field associated with light propagated in the waveguide.

The relative refractive index percent, $\Delta\% = 100 \times (n_i^2 - n_c^2)/2n_i^2$, where $n_i$ is the maximum refractive index in region i, unless otherwise specified, and $n_c$ is the average refractive index of the cladding region. In those cases in which the refractive index of a segment is less than the average refractive index of the cladding region, the relative index percent is negative and is calculated at the point at which the relative index is most negative unless otherwise specified.

The term $\alpha$-profile refers to a refractive index profile, expressed in terms of $\Delta(b)$ %, where b is radius, which follows the equation, $\Delta(b)\% = \Delta(b_0)(1 - [|b - b_0|/(b_1 - b_0)]^\alpha)$, where $b_0$ is the point at which $\Delta(b)\%$ is maximum, $b_1$ is the point at which $\Delta(b)\%$ is zero, and b is in the range $b_i \leq b \leq b_f$, where delta is defined above, $b_i$ is the initial point of the $\alpha$-profile, $b_f$ is the final point of the $\alpha$-profile, and $\alpha$ is an exponent which is a real number.

A waveguide fiber telecommunications link, or simply a link, is made up of a transmitter of light signals, a receiver of light signals, and a length of waveguide fiber having respective ends optically coupled to the transmitter and receiver to propagate light signals therebetween. The length of waveguide fiber can be made up of a plurality of shorter lengths that are spliced or connected together in end to end series arrangement. A link can include additional optical components such as optical amplifiers, optical attenuators, optical switches, optical filters, or multiplexing or demultiplexing devices. One may denote a group of inter-connected links as a telecommunications system.

SUMMARY OF THE INVENTION

One aspect of the present invention is a controlled dispersion optical waveguide fiber including a core region and a clad layer. The optical waveguide fiber has a number n of length portions each of which has a characteristic refractive index profile. That is, the optical waveguide fiber in accord with this aspect of the invention has a refractive index profile that varies along the fiber length. The refractive index profiles of the respective length portions are chosen to exhibit a particular total dispersion, $D_i$, and total dispersion slope, $S_i$, where i is an integer from 1 to n, the integer 1 assigned to a first length portion, the integer 2 to the second length portion, and so on, with the integer n assigned to the last or nth length portion. The total dispersion and total dispersion slope over the entire length of the optical waveguide fiber are controlled to within desired upper and lower limits by appropriate selection of the respective signs of total dispersion and total dispersion slope of the length portions. This aspect of the invention includes length portions having refractive index profiles that exhibit a sign of total dispersion opposite the sign of the associated total dispersion slope.

In an embodiment of this aspect of the invention, every length portion has total dispersion opposite in sign to its total dispersion slope.

In another embodiment of this aspect of the invention the optical waveguide fiber includes length portions having total dispersion and total dispersion slope of the same sign.

A second aspect of the invention is a telecommunication system including an optical waveguide fiber made in accord with the first aspect of the invention or any of the embodiments thereof.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE INVENTION

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the total dispersion and total dispersion slope characteristics of a controlled dispersion optical waveguide fiber of the present invention is shown in FIG. 2.

Figure 2:
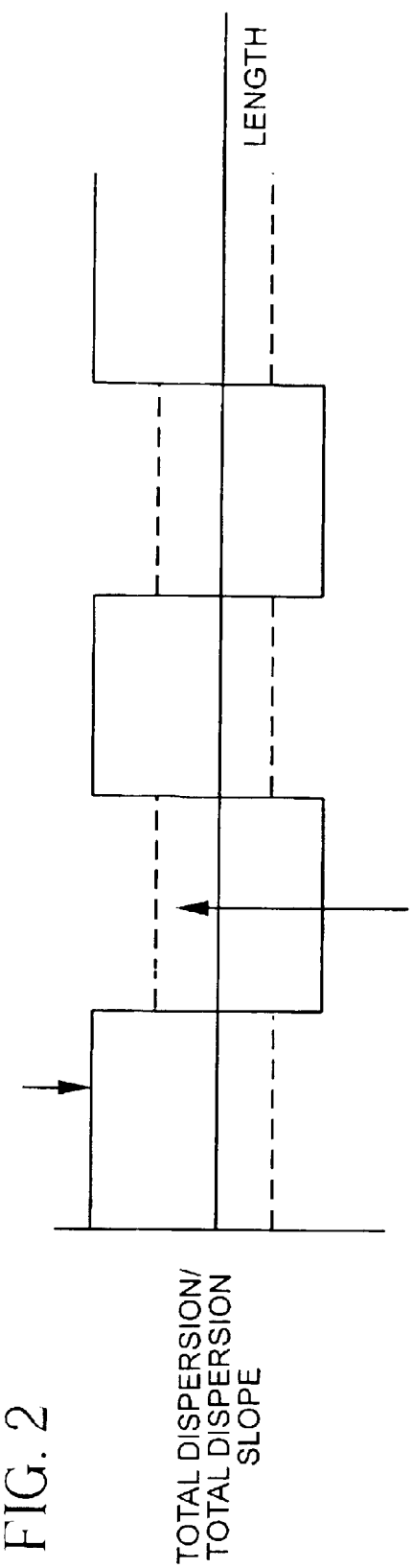
FIG. 2 is an illustration of a variation of total dispersion and total dispersion slope along the length of an optical waveguide fiber.

In accord with the invention, the controlled dispersion optical waveguide fiber exhibits in FIG. 2 a total dispersion 2 that alternates, along the length of the fiber, that is, along the axial direction of the fiber, between positive and negative values. The length of optical waveguide fiber characterized by a refractive index profile exhibiting a particular total dispersion or total dispersion slope is denoted throughout this specification as a length portion. The total dispersion slope, shown as curve 4 in FIG. 2, also alternates between positive and negative values among the length portions. FIG. 2 illustrates an embodiment in which, for a given length portion, the total dispersion and total dispersion slope are of opposite sign. One of the advantages of this optical waveguide fiber design is the avoidance of use of a refractive index profile in a length portion to provide negative total dispersion and negative total dispersion slope for that length portion. Such refractive index profiles require that the waveguide dispersion contribution to the total dispersion have a very high slope to combine with the material dispersion contribution to provide an overall negative total dispersion. Also, such refractive index profiles have properties sensitive to ordinary manufacturing variations, are more susceptible to bend induced loss, and relatively weakly guide the propagated light, i.e., are prone to light power leakage.

The alternation in sign of total dispersion over the length portions enables the control of dispersion that accumulates over the length of the fiber. That is, the sum of total dispersion products, i.e., $D_i$ multiplied by the length $l_i$ of the corresponding length portion, over all the length portions can be adjusted to lie within a selected range of values. In terms of mathematical symbols, the sum of dispersion products is, $$\sum_{i=1}^{n} D_i \times l_i,$$

where i takes on integer values from 1 to n, to represent each of the n length portions of the optical waveguide fiber. For the case in which $$\sum_{i=1}^{n} l_i = L,$$

where L is the total length of the waveguide fiber, the sum of dispersion products is denoted the end-to-end dispersion. It is advantageous to control the end to end dispersion to a low value to provide low dispersion of a signal pulse traversing the optical waveguide fiber. A typical desired range of the end to end dispersion is +/−10 ps/nm, and preferably +/−5 ps/nm. A target value of the end to end dispersion is often selected to be zero.

A telecommunication system assembled using dispersion controlled fiber in accord with the invention can span very large distances without need for electronic regeneration of the signal pulses due to the low total dispersion of the dispersion controlled fibers.

Because long distance telecommunications systems are expected to carry high data rates, wavelength division multiplexing is included in the system design. In order to compensate total dispersion for the wavelengths of the respective multiplexed signals over the optical waveguide fiber length, the total dispersion slope must be controlled as well. In analogy with the total dispersion product, the total dispersion slope product is controlled over the length of the fiber by alternating the sign of the total dispersion slope. In analogy with the sum of total dispersion products, the quantity to be controlled in the case of total dispersion slope is, $$\sum_{i=1}^{n} S_i \times l_i,$$

where $S_i$ is the total dispersion slope and $l_i$ is the length of the length portion designated by the integer i, which as above, takes on values from 1 to n. The sum of dispersion slope products is denoted the end-to-end dispersion slope. In analogy with end to end total dispersion, the sum of dispersion slope products is the end to end dispersion slope when $$\sum_{i=1}^{n} l_i = L.$$

The end to end total dispersion slope is typically controlled to within +/−10 ps/nm$^2$ and preferably controlled to within +/−5 ps/nm$^2$. An advantageous choice of target value for the end to end total dispersion slope products is zero. Designing the optical waveguide fiber to have nearly zero end to end total dispersion and total dispersion slope provides for non-zero dispersion along the fiber length together with essentially no pulse spreading over the length of the fiber for signals within a band of wavelengths. A preferred band of operating wavelengths is from about 1200 nm to 1700 nm, over which a silica based optical waveguide fiber typically has low attenuation. A more preferred band of operating wavelengths is 1450 nm to 1650 nm for which Rayleigh scattering is relatively lower than that at wavelengths above and below the more preferred range.

Although FIG. 2 shows the magnitudes of the total dispersion and total dispersion slope to be substantially equal from length portion to length portion, it will be understood that these magnitudes can be different for different length portions and still achieve desired control. Likewise, the length of the length portions need not be equal, and the particular sequence of positive and negative total dispersion and total dispersion slope length portions can vary.

Figure 1:
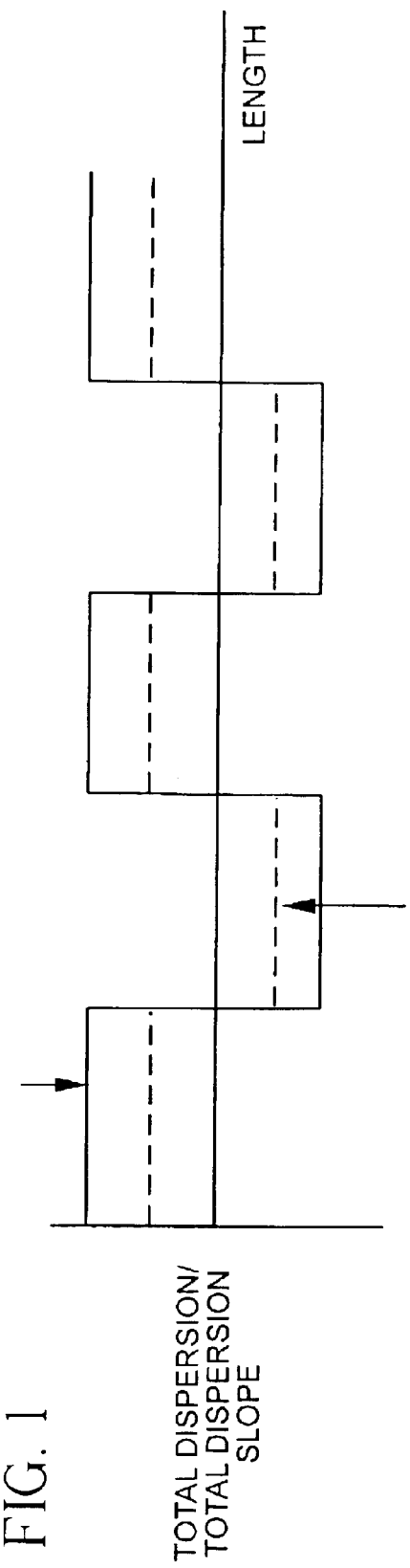
FIG. 1 is an illustration of a variation of total dispersion and total dispersion slope along the length of an optical waveguide fiber.
Figure 3:
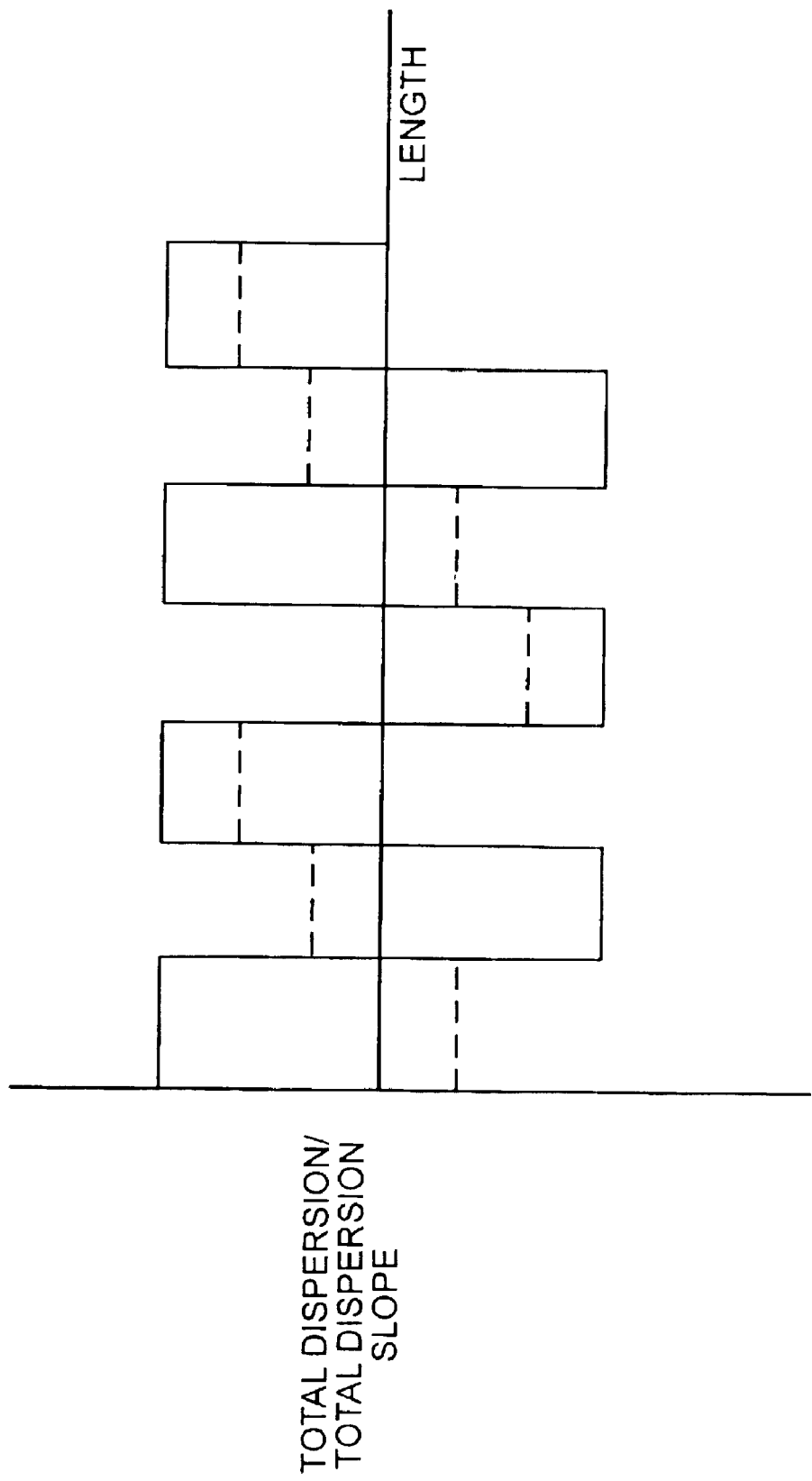
FIG. 3 is an illustration of a variation of total dispersion and total dispersion slope along the length of an optical waveguide fiber.

FIG. 1 is a chart of total dispersion 2 and total dispersion slope 4 showing the case where the refractive index profiles are chosen to provide total dispersion and total dispersion slope having the same sign over the length portions. This optical waveguide fiber profile design can be combined with the profile designs of FIG. 2 to provide a waveguide fiber having length portions as shown by curves 2 and 4 of FIG. 3. In FIG. 3, length portion 6 exhibits a positive total dispersion D and a negative total dispersion slope S, length portion 8 negative D and positive S, length portion 10 positive D and positive S, and length portion 12 negative D and negative S.

A dispersion controlled optical waveguide fiber including only length portions similar to 6 and 8 offers the performance advantages set forth above. However, embodiments of the invention which include length portions similar to 10 or 12 are also contemplated. For example, a D and S controlled optical waveguide fiber having a net positive end-to-end D and end-to-end S can be achieved by including, along with length portions similar to 6 and 8, one or more length portions similar to 10. Length portions similar to 12 can be included in optical waveguide fibers in which negative end-to-end D and end-to-end S are desired. Usually the length portions having like sign D and S can be kept to a minimum in the design of a system so as to minimize the drawbacks associated with the corresponding refractive index profiles described above.

Optical waveguide fibers having refractive index profiles that vary along the fiber length can be made using the methods disclosed and described in U.S. Pat. No. 5,504,829, Evans or in U.S. patent application Ser. No. 08/844,997, Berkey, both of which are incorporated herein by reference.

In the Evans patent is described a method of making a preform in which the chemical composition of the glass precursor gas delivered to a burner is adjusted as the burner traverses the preform to deposit glass soot. The chemical composition of the precursor gas determines the chemical composition, and thus the refractive index, of a soot layer. The refractive index profile of the preform, which is subsequently drawn into a waveguide fiber having a refractive index profile determined by the preform refractive index profile, is made up of a plurality of soot layers. Varying the chemical composition of the soot layer along the preform length results in an optical waveguide fiber having a refractive index profile that varies along the fiber length. A wide variety of profile variation along the fiber length is possible. In particular, the method of the Evans patent can be used to deposit a refractive index profile that varies, along the fiber length, from one to another of any of the refractive index profiles illustrated in FIGS. 4–13 of this specification as described below. Although the Evans method is generally directed to the outside deposition process, the method can readily be adapted to the inside or MCVD process, or the axial deposition process.

The method of making a preform described in the Berkey application also can be used to make a fiber having essentially any sequence of refractive index profiles along its length. The Berkey method makes use of a plurality of core preforms, which can be made by any of the preform making methods known in the art. The method of Berkey includes making core preforms having different respective refractive index profiles. Respective sections of the preforms are removed and placed in end to end series arrangement with one another. For example, a plurality of preform sections having respective desired refractive index profiles may be placed in a tube made of overclad glass. The assembly is drawn into an optical waveguide fiber having a sequence of refractive index profiles along the fiber length.

Turning now to the refractive index profiles that provide the desired total dispersion and total dispersion slope of the length portions of the optical waveguide fibers in accord with the invention, the core region of the waveguide fibers are preferably of segmented core design, each segment being characterized by a radius and a relative refractive index percent. The combinations of positive or negative D with positive or negative S, as shown in FIGS. 1–3 and described above, can be achieved by fabricating a waveguide fiber having a four segment core region. In this four segment embodiment of a refractive index profile in accord with the invention, the core region includes, referring for example to FIG. 5, a central segment 20 having a relative refractive index percent $\Delta_0\%$ and a radius 26, $r_0$, a first annular segment 22 surrounding the central segment having a relative refractive index percent $\Delta_1\%$ and a radius 28, $r_1$, a second annular segment 36 surrounding the first annular segment having a relative refractive index percent $\Delta_2\%$ and a radius 32, $r_2$, a third annular segment 38 surrounding the second annular segment having a relative refractive index percent $\Delta_3\%$ and a radius 34, $r_3$. The relationship among the relative refractive index percents is, $\Delta_0\% > \Delta_3\% > \Delta_2\% > \Delta_1\%$, and $\Delta_1\%$ is negative. The properties of this four segment core waveguide fiber are: effective area greater than about 40 $\mu$m; mode field diameter greater than 7.0 $\mu$m; and pin array bend loss less than or equal to 12 dB. All of these properties are stated at a wavelength of 1550 nm.

The ranges of relative refractive index percents and radii of this four segment embodiment are defined by the relationships, $0.50\% \leq \Delta_0\% \leq 1.0\%$, $-0.55\% \leq \Delta_1\% \leq -0.1\%$, $-0.1 \leq \Delta_2\% \leq 0.1\%$, $0.1\% \leq \Delta_3\% \leq 0.7\%$, $2.5 \ \mu m \leq r_0 \leq 5.0 \ \mu m$, $4.0 \ \mu m \leq r_1 \leq 7.0 \ \mu m$, $4.0 \ \mu m \leq r_2 \leq 9.0 \ \mu m$, and $5.0 \ \mu m \leq r_3 \leq 10.0 \ \mu m$.

Figure 12:
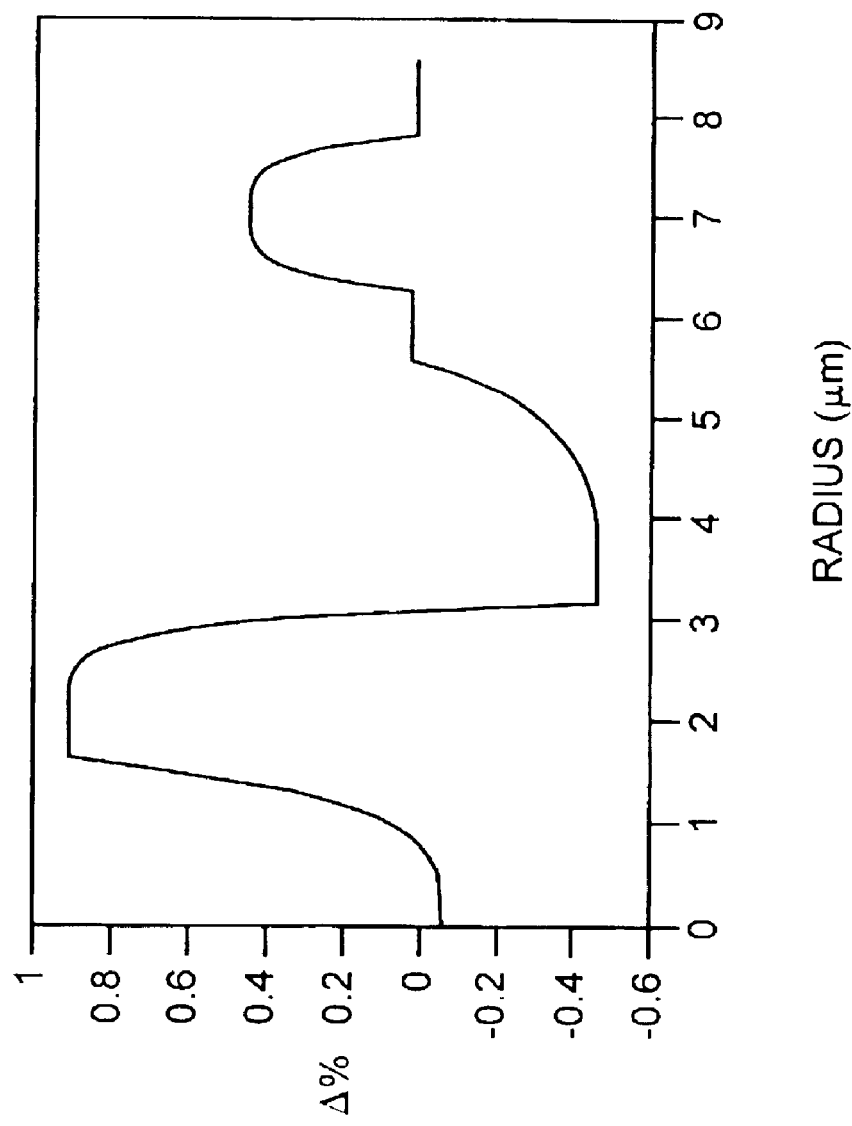

A five segment embodiment of a core having a refractive index profile of a length portion in accord with the invention, referring for example to FIG. 12, has a central segment 40 having a relative refractive index percent $\Delta_0\%$ and a radius 50, $r_0$, a first annular segment 42 surrounding the central segment having a relative refractive index percent $\Delta_1\%$ and a radius 52, $r_1$, a second annular segment 44 surrounding the first annular segment having a relative refractive index percent $\Delta_2\%$ and a radius 54, $r_2$, a third annular segment 46 surrounding the second annular segment having a relative refractive index percent $\Delta_3\%$ and a radius 56, $r_3$, and a fourth annular segment 48 surrounding the third annular segment having a relative refractive index percent $\Delta_4\%$ and a radius 58, $r_4$. The relationship among the relative refractive index percents is, $\Delta_1\% > \Delta_4\% > (\Delta_0\%$ and $\Delta_3\%) > \Delta_2\%$ and $\Delta_2\%$ is negatative. Pertinent fiber properties in this embodiment, all stated at 1550 nm, are, effective area greater than about 40 $\mu$m, mode field diameter greater than 7.0 $\mu$m, and pin array bend loss less than or equal to 12 dB.

The ranges of relative refractive index percents and radii of this five segment embodiment are defined by the relationships, $-0.20\% \leq \Delta_0\% \leq 0.50\%$, $0.50\% \leq \Delta_1\% \leq 1.0\%$, $-0.55 \leq \Delta_2\% \leq -0.10\%$, $-0.10\% \leq \Delta_3\% \leq 0.1\%$, $0.10\% \leq \Delta_4\% \leq 0.70\%$, $0.50 \ \mu m \leq r_0 \leq 2.0 \ \mu m$, $2.5 \ \mu m \leq r_1 \leq 4.0 \ \mu m$, $5.0 \ \mu m \leq r_2 \leq 7.0 \ \mu m$, $6.0 \ \mu m \leq r_3 \leq 8.0 \ \mu m$, and $7.0 \ \mu m \leq r_4 \leq 10.0 \ \mu m$.

The definitions of the respective radii are set forth in the following descriptions of the drawings.

Figure 4:
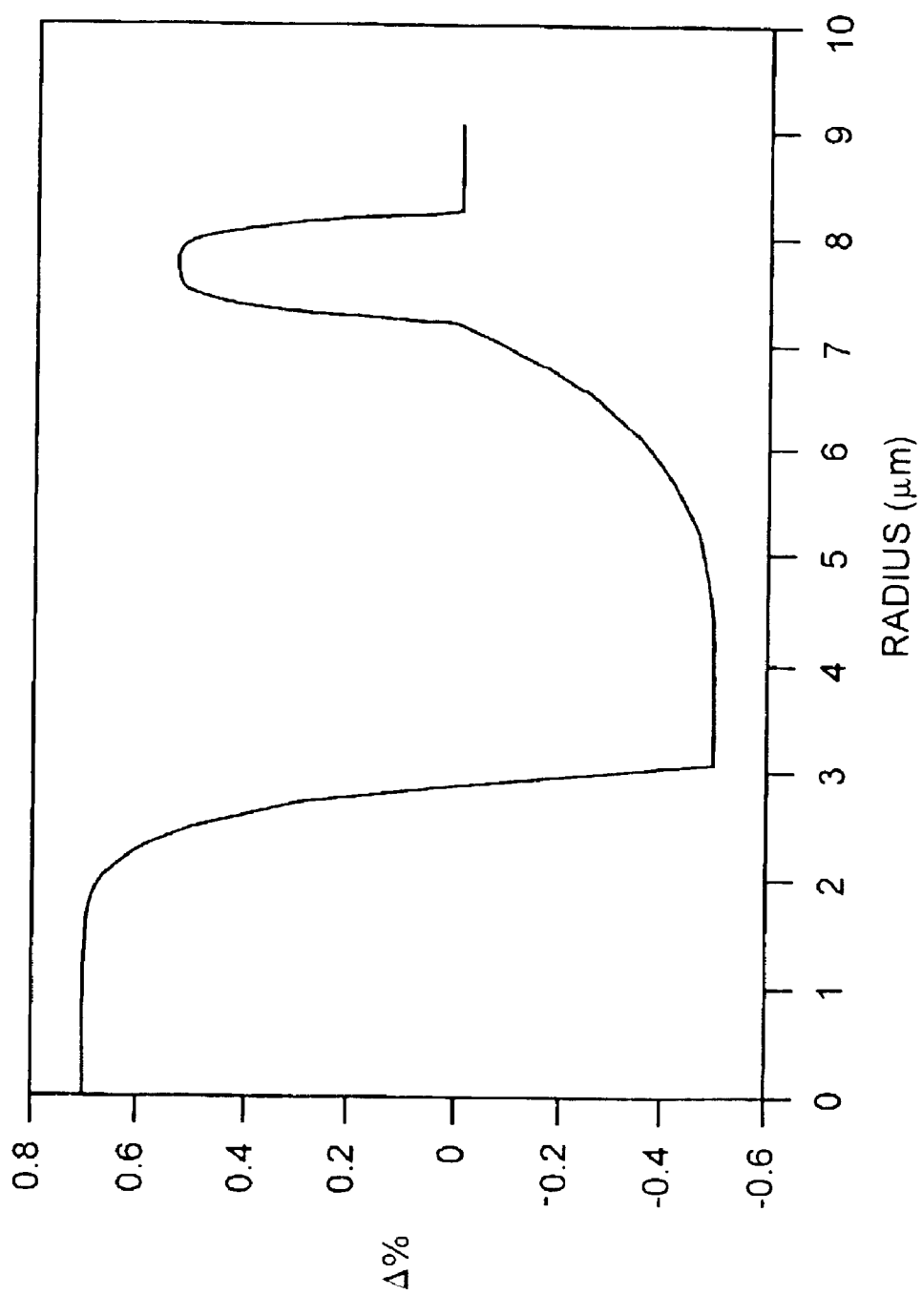
FIGS. 4–13 are charts of refractive index profiles suitable for length portions of an optical waveguide fiber in accord with the invention.

A three segment embodiment of the core region of a length portion in accord with the invention is shown in FIG. 4. Central segment 20 has relative refractive index percent $\Delta_0\%$ and radius 26, $r_0$, measured from the center of the profile (the centerline of the waveguide fiber) to the point where the descending portion of segment 20 crosses the horizontal axis, the zero crossing. First annular segment 22 has relative refractive index percent $\Delta_1\%$ and radius 28, $r_1$, measured from the centerline to the zero crossing of the ascending portion of segment 22. Segment 24 has relative refractive index percent $\Delta_2\%$, and radius 30, $r_2$, measured from the centerline to the zero crossing of the descending portion of segment 24. In cases where an ascending or descending portion of a profile segment does not cross the horizontal axis, that ascending or descending portion is extrapolated to the horizontal axis and the radius measured to the extrapolated zero crossing.

The relative refractive index percents and radii of the profile of FIG. 4 have the ranges, $0.6\% \leq \Delta_0\% \leq 0.8\%$, $-0.5\% \leq \Delta_1\% \leq -0.4\%$, $0.4\% \leq \Delta_2\% \leq 0.6\%$, $2.5 \ \mu m \leq r_0 \leq 3.5 \ \mu m$, $6.5 \ \mu m \leq r_1 \leq 7.5 \ \mu m$, and $7.5 \ \mu m \leq r_2 \leq 8.5 \ \mu m$. The pertinent functional properties are, all stated at 1550 nm, effective area greater than about 25 $\mu$m, mode field diameter greater than 6 $\mu$m, and pin array bend loss less than or equal to 12 dB.

For the particular refractive index profile charted in FIG. 4, the functional parameters are, all stated at 1550 nm, total dispersion 5 ps/nm-km, total dispersion slope $-0.016$ ps/nm$^2$-km, effective area 28.4 $\mu$m$^2$, cutoff wavelength 1540 nm, mode field diameter 6.02 $\mu$m, and pin array bend loss 12 dB. As used herein, the cut off wavelength refers to cut off measured or calculated on the fiber itself. It is known in the art that the bending induced in the fiber during a buffering or cabling process reduces the cut off wavelength, typically by an amount on the range of 200 nm to 600 nm, depending upon the type of profile under consideration, as well as the buffering or cabling process.

Figure 10:
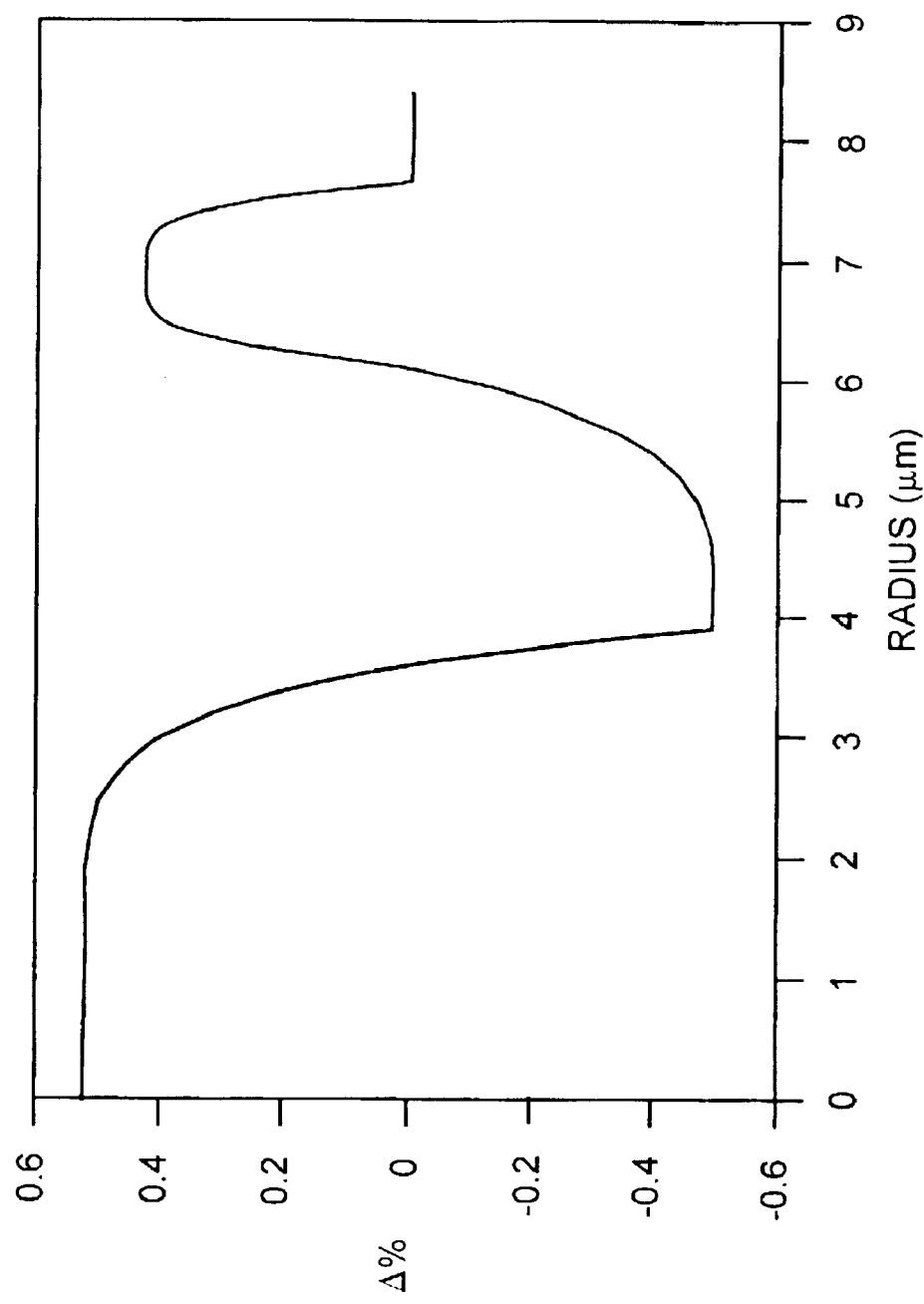
Figure 11:
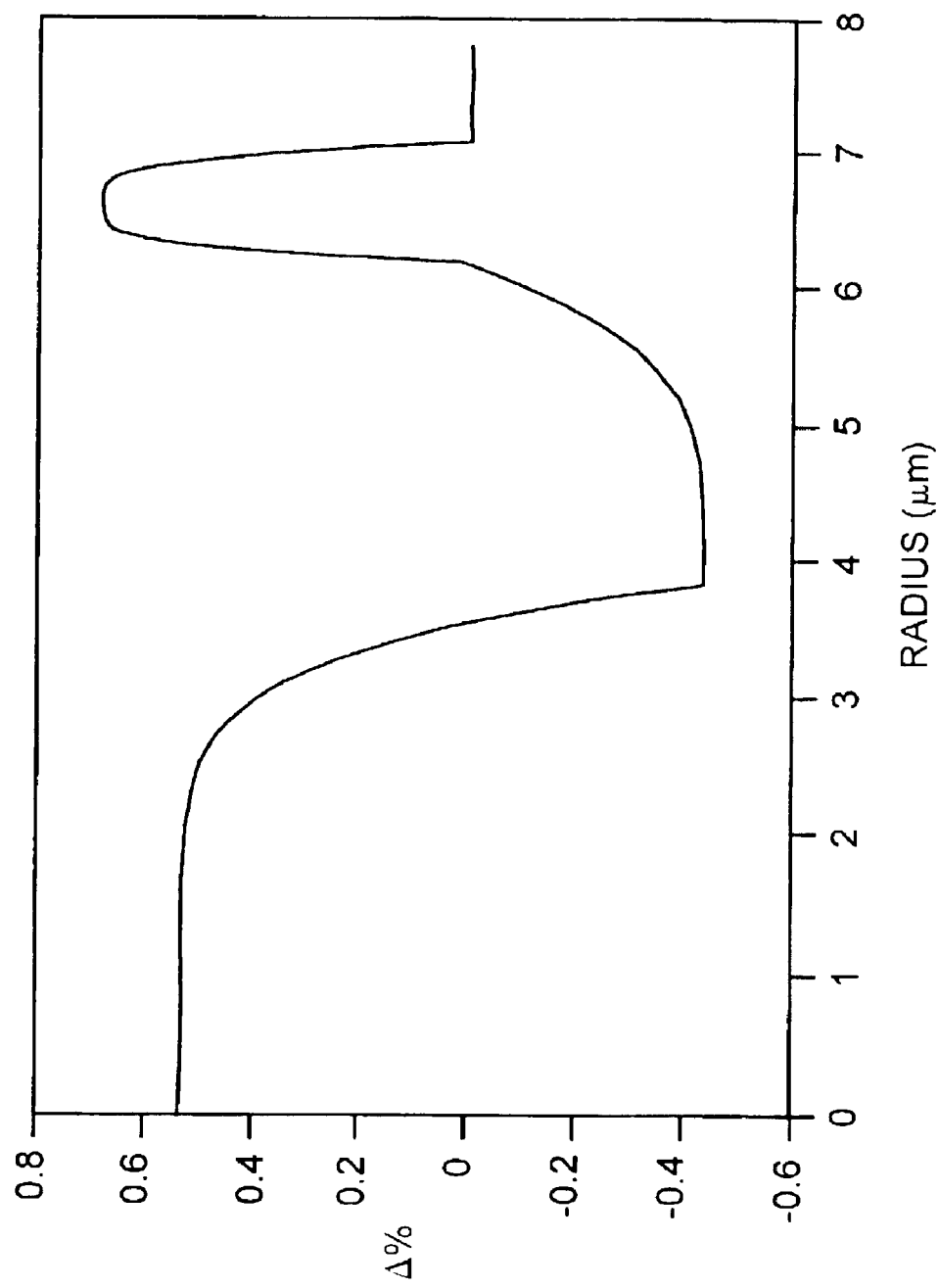

A three segment core region can provide positive values of both total dispersion and total dispersion slope. Such three segment refractive index profiles are shown in FIGS. 10 and 11. The radii are defined as in the description of FIG. 4 above. The relative refractive index percents follow the relationship, ($\Delta_0\%$ and $\Delta_2\%$)$>\Delta_1\%$, and $\Delta_1\%$ is negative. The ranges of the relative refractive index percents and radii for these embodiments are $0.6\% \leq \Delta_0\% \leq 0.8\%$, $-0.5\% \leq \Delta_1\% \leq -0.4\%$, $0.4\% \leq \Delta_2\% \leq 0.6\%$, $3.5 \ \mu m \leq r_0 \leq 4.2 \ \mu m$, $5.8 \ \mu m \leq r_1 \leq 6.5 \ \mu m$, and $6.5 \ \mu m \leq r_2 \leq 8.0 \ \mu m$. Some pertinent properties of the waveguides of FIGS. 10 and 11, all at a wavelength of 1550 nm, are, effective area greater than about 40 $\mu$m, mode field diameter greater than 7 $\mu$m, and pin array bend loss less than or equal to 12 dB.

For the particular refractive index profile charted in FIG. 10, the functional parameters are, all stated at 1550 nm, total dispersion 5 ps/nm-km, total dispersion slope 0.014 ps/nm$^2$-km, effective area 45 $\mu$m$^2$, cutoff wavelength 1540 nm, mode field diameter 7.5 $\mu$m, and pin array bend loss 12 dB.

For the particular refractive index profile charted in FIG. 11, the functional parameters are, all stated at 1550 nm, total dispersion 5 ps/nm-km, total dispersion slope 0.02 ps/nm$^2$-km, effective area 45 $\mu$m$^2$, cutoff wavelength 1450 nm, mode field diameter 7.54 $\mu$m, and pin array bend loss 12 dB.

Figure 5:
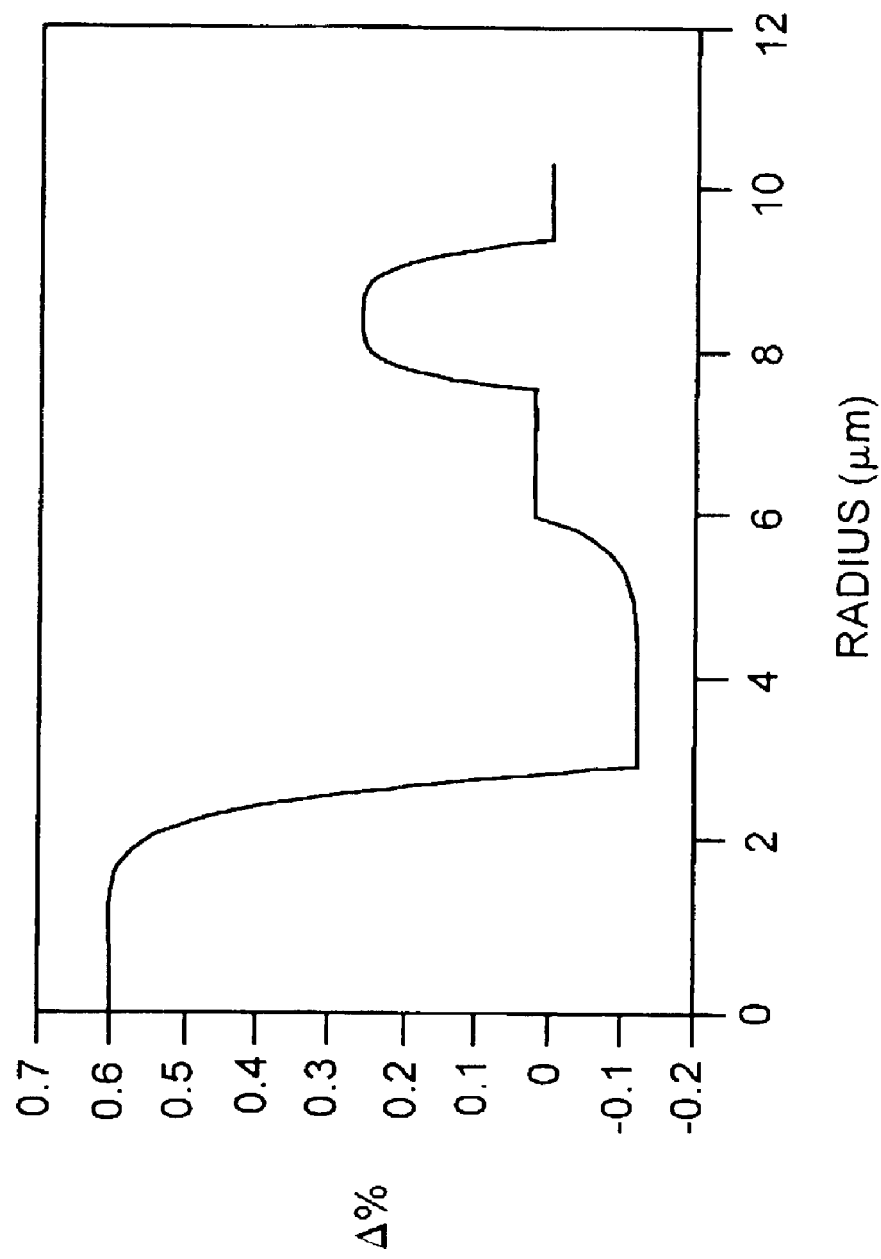
Figure 6:
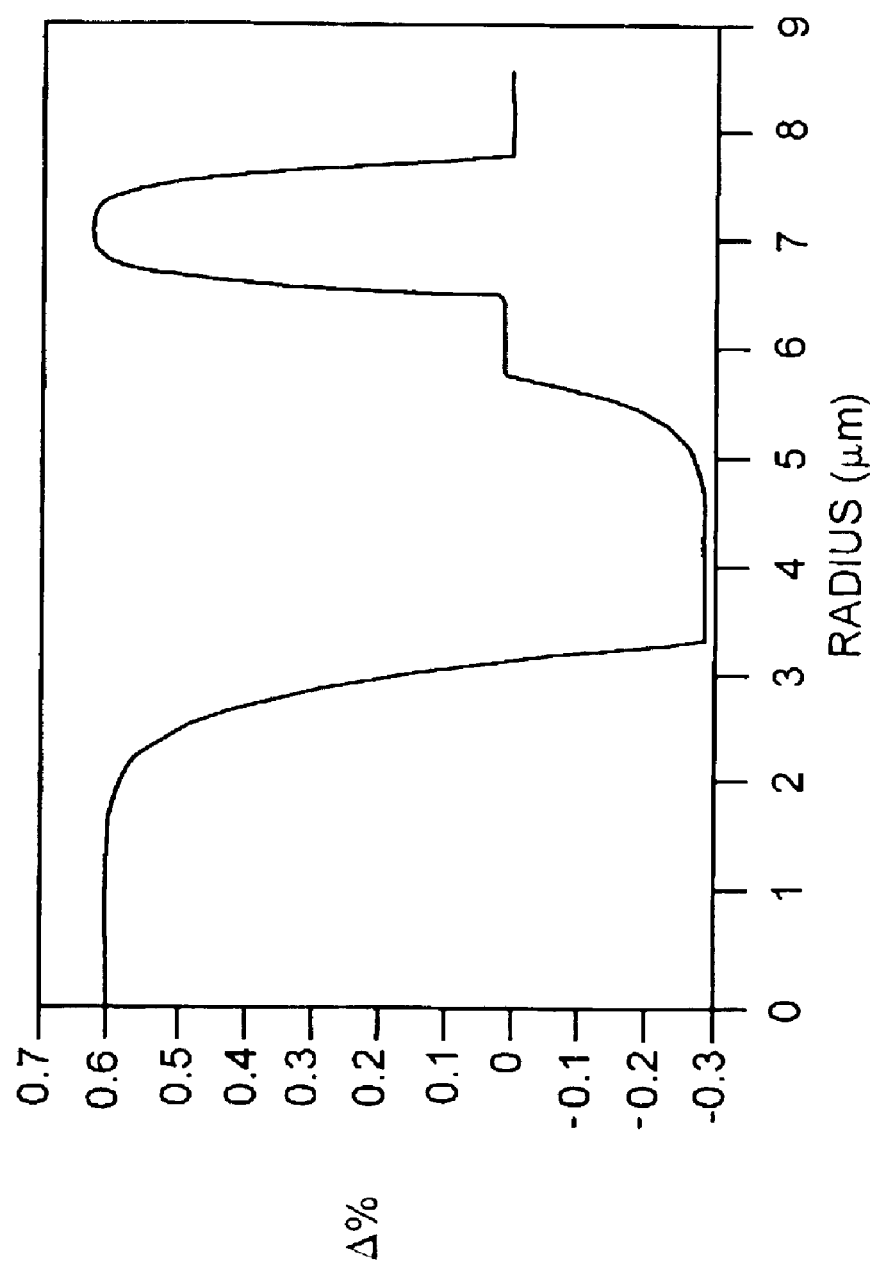

Four segment embodiments of the refractive index profile of length portions for which the total dispersion is negative and the total dispersion slope positive are shown in FIGS. 5 and 6. Central segment 20 has relative refractive index percent $\Delta_0\%$ and radius 26, $r_0$. First annular segment 22 surrounding the central segment has a relative refractive index percent $\Delta_1\%$ and a radius 28, $r_1$. Second annular segment 36 surrounding the first annular segment has a relative refractive index percent $\Delta_2\%$ and a radius 32, $r_2$. Third annular segment surrounding 38 the second annular segment has a relative refractive index percent $\Delta_3\%$ and a radius 4, $r_3$. For the refractive index profile of FIG. 5, the relative refractive index percents follow the relationship, $\Delta_0\% > \Delta_3\% > \Delta_2\% > \Delta_1\%$, and $\Delta_1\%$ is negative. In FIG. 6, the relationship is $\Delta_3\% > \Delta_0\% > \Delta_2\% > \Delta_1\%$, and $\Delta_1\%$ is negative. Pertinent properties of these profiles, all stated at 1550 nm, are, effective area greater than about 40 $\mu$m, mode field diameter greater than 7.0 $\mu$m, and pin array bend loss less than or equal to 12 dB.

The profile shown in FIG. 5 has relative refractive index percent and radius limits, $0.55\% \leq \Delta_0\% \leq 0.65\%$, $-0.15\% \leq \Delta_1\% \leq -0.05\%$, $0 \leq \Delta_2\% \leq 0.1\%$, $0.2\% \leq \Delta_3\% \leq 0.3\%$, $2.5 \ \mu m \leq r_0 \leq 3.5 \ \mu m$, $5.5 \ \mu m \leq r_1 \leq 6.5 \ \mu m$, $6.5 \ \mu m \leq r_2 \leq 8.0 \ \mu m$, $9.0 \ \mu m \leq r_3 \leq 10.0 \ \mu m$. The definitions of the respective segment radii for the profiles in FIGS. 5 and 6 are analogous to those of FIG. 4 described in detail above. The radii of the central segment and first annular segment are measured as in FIG. 4. The radius of the second annular segment is measured from the centerline to the point where the second annular segment meets the ascending portion of the third annular segment. These definitions are consistently applied even if, as is the case for the refractive index profile in FIG. 6, the flat portion of the second annular segment is above the horizontal axis.

For the particular refractive index profile charted in FIG. 5 the functional parameters, all stated at 1550 nm, are, total dispersion $-5.2$ ps/nm-km, total dispersion slope 0.021 ps/nm$^2$-km, effective area 45 $\mu$m$^2$, cutoff wavelength 1689 nm, mode field diameter 7.68 $\mu$m, and pin array bend loss 12 dB.

The profile shown in FIG. 6 has relative refractive index percent and radius limits, $0.55\% \leq \Delta_0\% \leq 0.65\%$, $-0.35\% \leq \Delta_1\% \leq -0.25\%$, $0 \leq \Delta_2\% \leq 0.1\%$, $0.06\% \leq \Delta_3\% \leq 0.7\%$, $3.0 \ \mu m \leq r_0 \leq 3.8 \ \mu m$, $5.0 \ \mu m \leq r_1 \leq 6.0 \ \mu m$, $6.0 \ \mu m \leq r_2 \leq 7.0 \ \mu m$, $7.5 \ \mu m \leq r_3 \leq 8.5 \ \mu m$.

For the particular refractive index profile charted in FIG. 6, the functional parameters are, all stated at 1550 nm, total dispersion $-5.0$ ps/nm-km, total dispersion slope 0.02 ps/nm²-km, effective area 45.5 $\mu m^2$, cutoff wavelength 1730 nm, mode field diameter 7.54 $\mu m$, and pin array bend loss 5.62 dB.

Figure 7:
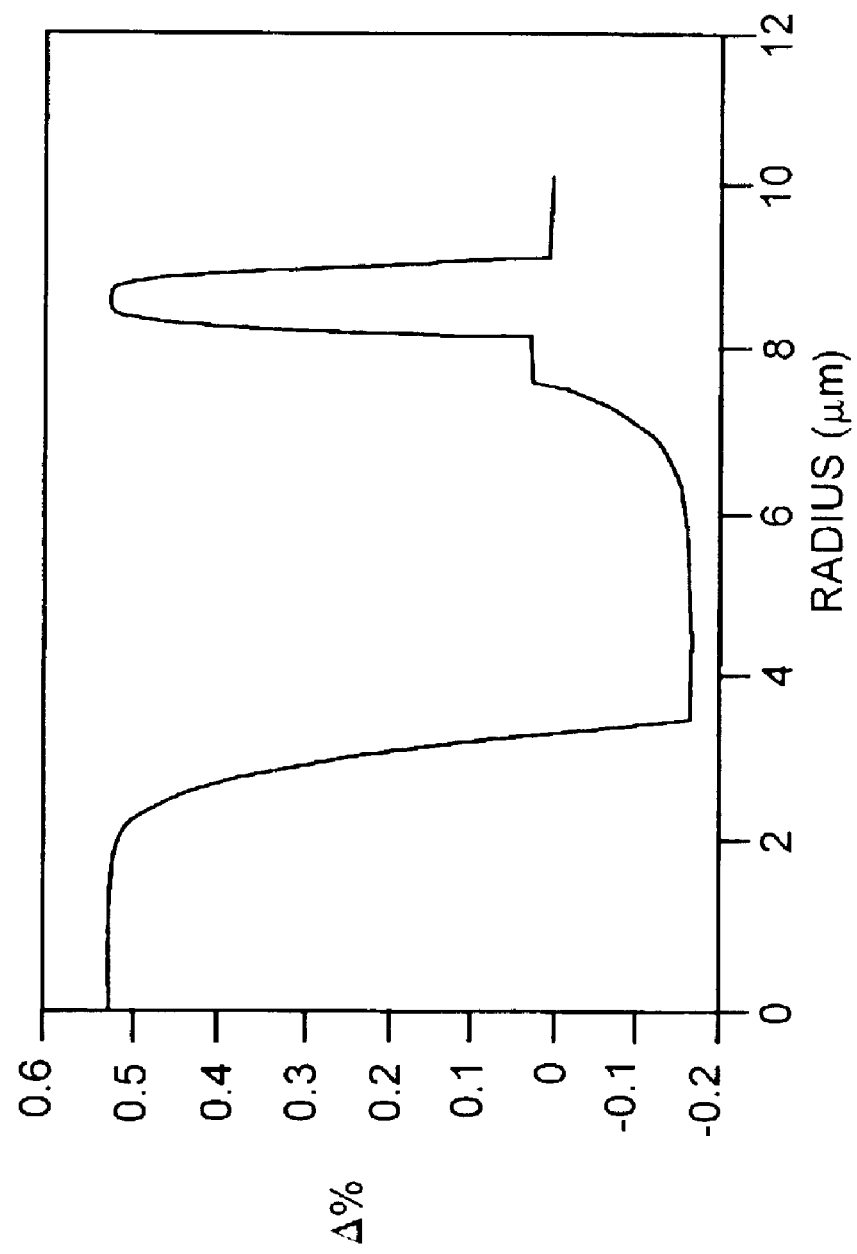

Another four segment embodiment of a refractive index profile in accord with the invention is shown in FIG. 7. In this embodiment the total dispersion is positive and the total dispersion slope is positive. The relative refractive index percents follow the relationship ($\Delta_0\%$ and $\Delta_3\%$)>$\Delta_2\%$>$\Delta_1\%$, and $\Delta_1\%$ is negative. The radii are defined as shown in FIG. 5 and the discussion thereof above. Pertinent properties of this profile, all stated at 1550 nm, are, effective area greater than about 40 $\mu m$, mode field diameter greater than 7.0 $\mu m$, and pin array bend loss less than or equal to 12 dB.

The profile shown in FIG. 7 has relative refractive index percent and radius limits, $0.48\% \leq \Delta_0\% \leq 0.58\%$, $-0.15\% \leq \Delta_1\% \leq -0.21\%$, $0 \leq \Delta_2\% \leq 0.1\%$, $0.48\% \leq \Delta_3\% \leq 0.58\%$, $3.0 \ \mu m \leq r_0 \leq 4.0 \ \mu m$, $7.5 \ \mu m \leq r_1 \leq 8.0 \ \mu m$, $7.9 \ \mu m \leq r_2 \leq 8.5 \ \mu m$, $8.8 \ \mu \leq r_3 \leq 9.5 \ \mu m$.

For the particular refractive index profile charted in FIG. 7, the functional parameters are, all stated at 1550 nm, total dispersion 5.2 ps/nm-km, total dispersion slope 0.02 ps/nm²-km, effective area 45.2 $\mu m^2$, cutoff wavelength 1680 nm, mode field diameter 7.68 $\mu m$, and pin array bend loss 11.7 dB.

Figure 9:
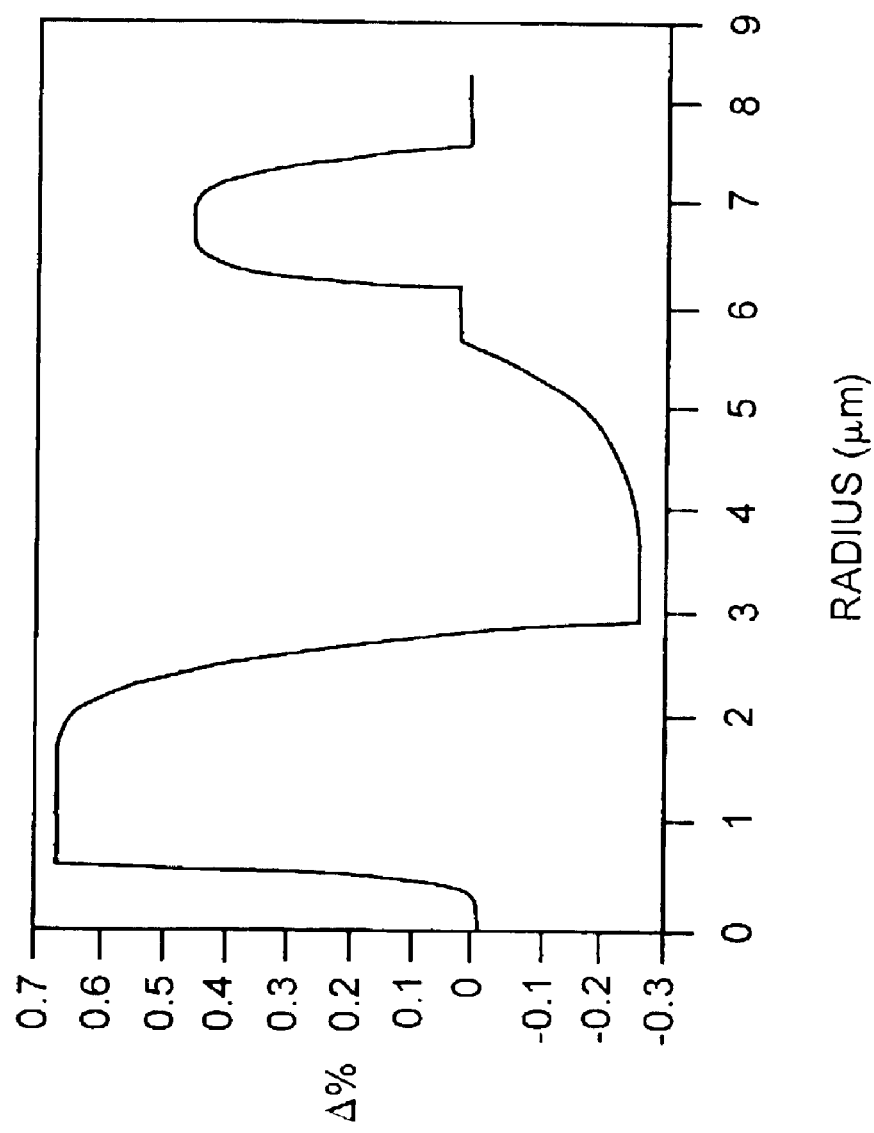
Figure 13:
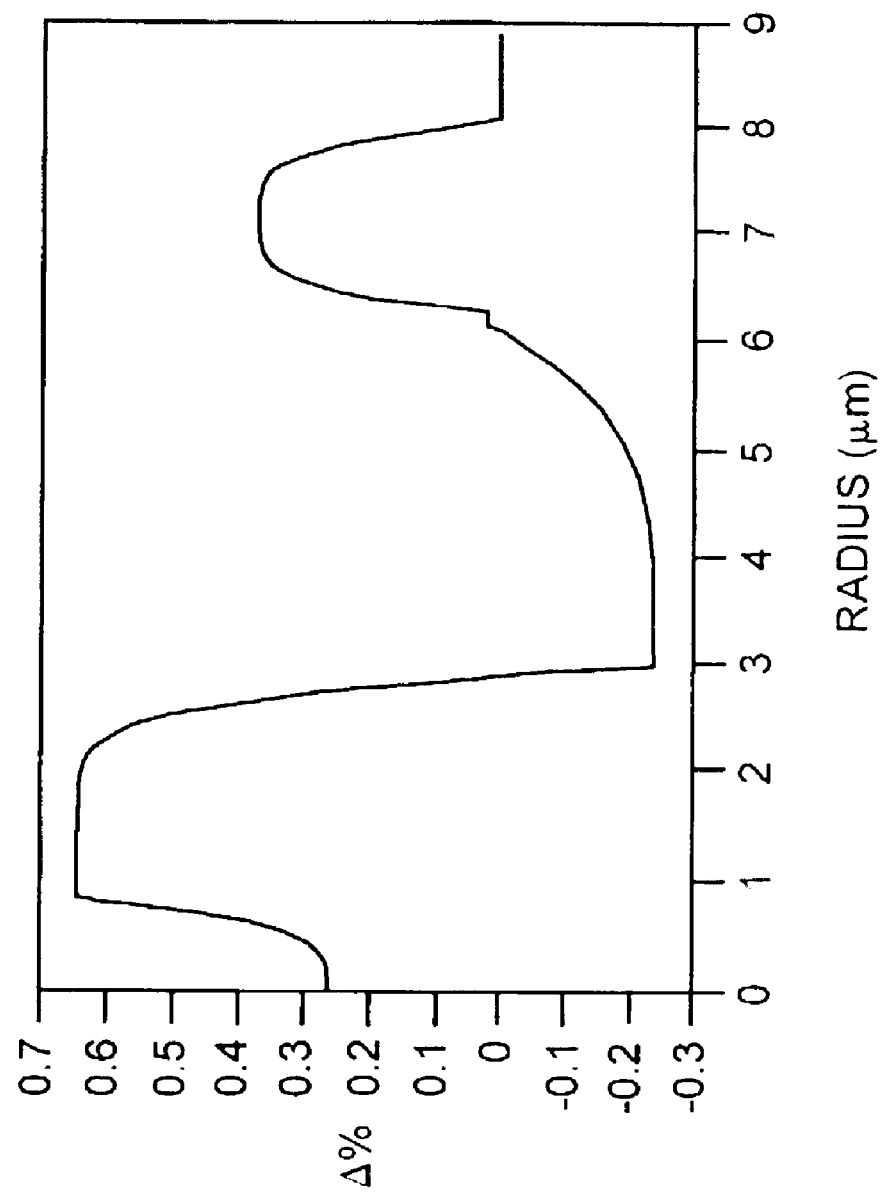

Five segment embodiments of the refractive index profile of length portions for which the total dispersion is negative and the total dispersion slope positive are shown in FIGS. 9, 12, and 13. The definitions of radii for the five segment embodiments are illustrated in FIG. 12. With reference to FIG. 12, central segment 40 has relative refractive index percent $\Delta_0\%$, which for the central segment 40 is its minimum relative refractive index percent, and a radius 50, $r_0$, measured from the fiber centerline to the intersection of segment 40 with first annular segment 42 surrounding central segment 40. For the refractive index profiles disclosed and described in this specification, the first point of annular segment 42 is the point at which the relative index percent of segment 40 reaches the value $\Delta_1\%$, the relative index percent of first annular segment 42. Segment 42 has radius 52, $r_1$, measured from the centerline to the point where the descending portion of segment 42 crosses the horizontal axis. Second annular segment 44 surrounding first annular segment 42 has a relative refractive index percent $\Delta_2\%$, taken at the minimum point of segment 44, and a radius, 54, $r_2$, measured from the centerline to the point at which the relative refractive index percent of segment 44 rises to the value $\Delta_3\%$, the relative index of third annular segment 46, surrounding second annular segment 44. Segment 46 has a relative refractive index percent $\Delta_3\%$ and a radius 56, $r_3$, measured from the centerline the point where segment 46 meets the ascending portion of fourth annular segment 48, surrounding third annular segment 46. Fourth annular segment 48 has relative refractive index percent $\Delta_4\%$ and a radius 58, $r_4$, measured from the centerline to the point where the descending portion of segment 48 meets the horizontal axis. The respective relative refractive index percents follow the relationship, $\Delta_1\% > \Delta_4\% > (\Delta_0\%$ and $\Delta_3\%) > \Delta_2\%$, and $\Delta_2\%$ is negative. These five segment profiles exhibit properties, all stated at 1550 nm, effective area greater than about 40 $\mu m$, mode field diameter greater than 7.0 $\mu m$, and pin array bend loss less than or equal to 12 dB.

The profiles of FIGS. 9, 12, and 13 have limits of respective relative refractive index percents and radii, $-0.10\% \leq \Delta_0\% \leq 0.30\%$, $0.60\% \leq \Delta_1\% \leq 1.0\%$, $-0.50 \leq \Delta - 0.20\%$, $0 \leq \Delta_3\% \leq 0.1\%$, $0.30\% \leq \Delta_4\% \leq 0.50\%$, $0.50 \ \mu m \leq r_0 \leq 1.6 \ \mu m$, $2.5 \ \mu m \leq r_1 \leq 3.5 \ \mu m$, $5.2 \ \mu m \leq r_2 \leq 6.0 \ \mu m$, $6.0 \ \mu m \leq r_3 \leq 6.5 \ \mu m$, and $7.4 \ \mu m \leq r_4 \leq 8.3$ m.

For the particular refractive index profile charted in FIG. 9, the functional parameters are, all stated at 1550 nm, total dispersion $-7.2$ ps/nm-km, total dispersion slope 0.022 ps/nm²-km, effective area 45.0 $\mu m^2$, cutoff wavelength 1600 nm, mode field diameter 7.47 $\mu m$, and pin array bend loss 11.9 dB.

For the particular refractive index profile charted in FIG. 12, the functional parameters are, all stated at 1550 nm, total dispersion $-5.2$ ps/nm-km, total dispersion slope 0.019 ps/nm²-km, effective area 49.0 $\mu m^2$, cutoff wavelength 1650 nm, mode field diameter 7.19 $\mu m$, and pin array bend loss 5.9 dB.

For the particular refractive index profile charted in FIG. 13, the functional parameters are, all stated at 1550 nm, total dispersion $-5.2$ ps/nm-km, total dispersion slope 0.02 ps/nm²-km, effective area 46.4 $\mu m^2$, cutoff wavelength 1630 nm, mode field diameter 7.61 $\mu m$, and pin array bend loss 11.9 dB.

Figure 8:
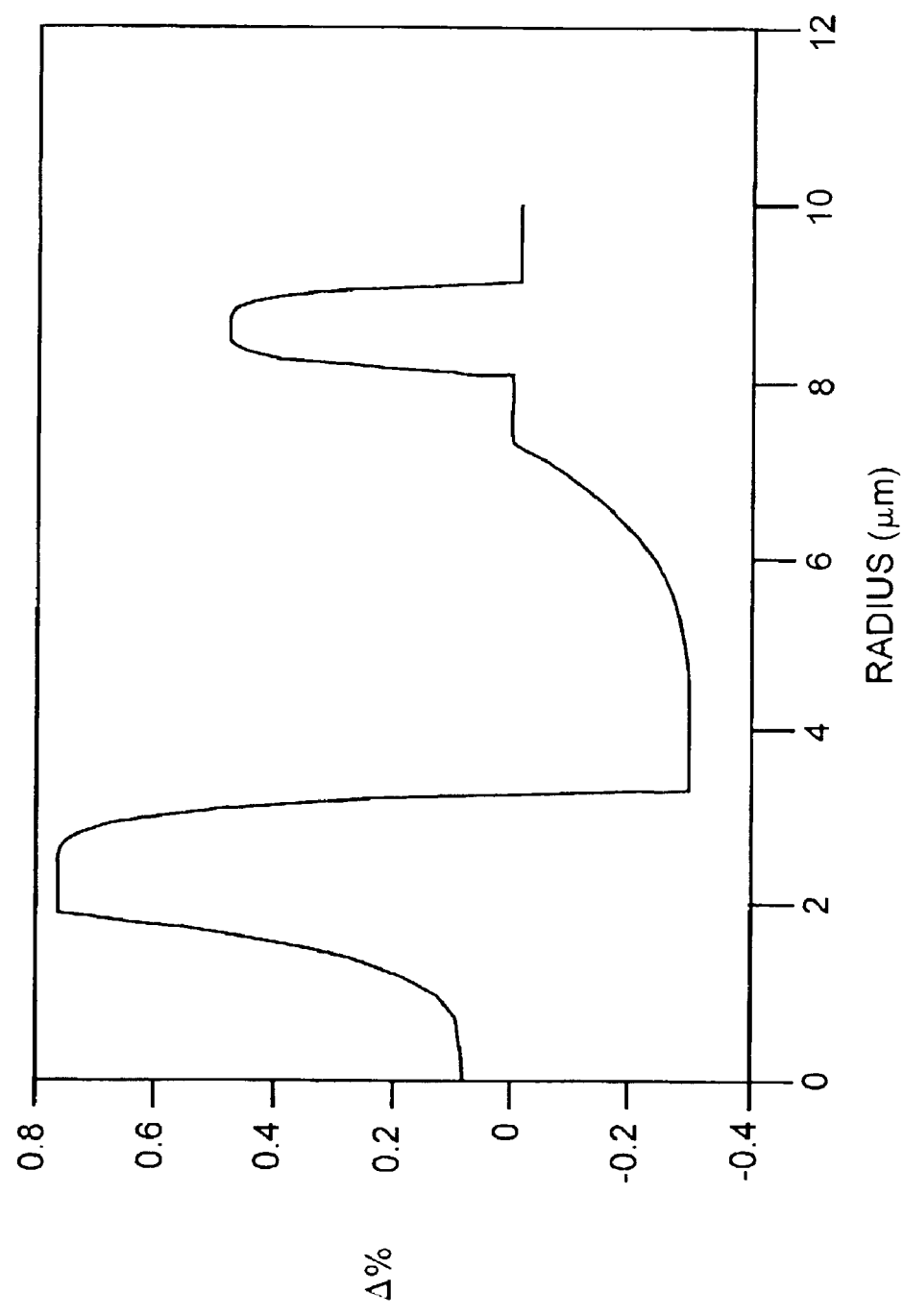

A five segment core region refractive index profile can also provide a length portion having positive total dispersion and positive total dispersion slope. Such a profile is shown in FIG. 8. The definitions of relative refractive index percents and radii are the same as those set forth in the discussion of FIG. 12 above. The relative refractive index percents of the profile of FIG. 8 follow the relationship, $\Delta_2\% > \Delta_4\% > (\Delta_0\%$ and $\Delta_3\%) > \Delta_2\%$, and $\Delta_2\%$ is negative. Pertinent functional properties are, all stated at 1550 nm, effective area greater than about 40 $\mu m$, mode field diameter greater than 7.0 $\mu m$, and pin array bend loss less than or equal to 12 dB.

The limits on the structural parameters of the profile shown in FIG. 8 are, $0.04\% \leq \Delta_0\% \leq 0.14\%$, $0.70\% \leq \Delta_1\% \leq 0.82\%$, $-0.32 \leq \Delta_2\% \leq -0.25\%$, $0 \leq \Delta_3\% \leq 0.1\%$, $0.44\% \leq \Delta_4\% \leq 0.52\%$, $1.40 \ \mu m \leq r_0 \leq 2.2 \ \mu m$, $2.8 \ \mu m \leq r_1 \leq 3.6 \ \mu m$, $6.8 \ \mu m \leq r_2 \leq 7.6 \ \mu m$, $7.6 \ \mu m \leq r_3 \leq 8.4 \ \mu m$, and $8.7 \ \mu m \leq r_4 \leq 9.5 \ \mu m$.

For the particular refractive index profile charted in FIG. 8, the functional parameters are, all stated at 1550 nm, total dispersion 5.2 ps/nm-km, total dispersion slope 0.02 ps/nm²-km, effective area 50.0 $\mu m^2$, cutoff wavelength 1698 nm, mode field diameter 7.5 $\mu m$, and pin array bend loss 11.9 dB.

In each of the embodiments of the refractive index profiles of the length portions, the magnitude of the total dispersion and of the total dispersion slope are about equal to each other, thus providing for a simple design of the sequence of length portions that make up the dispersion controlled optical waveguide fiber. For example, many combinations of refractive index profiles of the length portions allow one to fabricate the dispersion controlled optical waveguide fiber using substantially equal length portions.

Optical waveguide fibers made in accord with the invention can be used in telecommunication systems to provide systems having non-zero dispersion along the system length while exhibiting an end to end dispersion and end to end dispersion slope within essentially any pre-selected range of values. An advantageous use of the optical waveguide fibers in accord with the invention is in a telecommunication system having substantially zero end to end total dispersion over a range of wavelengths, thus enabling long distance, unregenerated, wavelength division multiplexed systems.

It will be apparent to those skilled in the art that various modifications and variations of the present invention can be made without departing from the spirit and scope of the invention. Thus, it is intended that the present invention include the modifications and variations of this invention provided they come within the scope of the appended claims and their equivalents.

We claim:

1. A dispersion controlled optical waveguide fiber comprising:
a core region surrounded by a clad layer, said optical waveguide fiber having a number n of length portions, said core region along each respective length portion having a respective refractive index profile, the respective index profiles chosen to provide, over a selected wavelength range, a total dispersion $D_i$ and a total dispersion slope $S_i$, i being an integer ranging from 1 to n, and an integer being assigned to each of the length portions, wherein,
the sign of total dispersion is positive and the sign of total dispersion slope is negative for selected length portions, and the sign of total dispersion is negative and the sign of total dispersion slope is positive for other selected length portions.

2. The dispersion controlled waveguide fiber of claim 1 wherein the selected wavelength range is from about 1200 nm to 1700 nm.

3. The dispersion controlled waveguide fiber of claim 2 wherein the selected wavelength range is from about 1450 nm to 1650 nm.

4. The dispersion controlled waveguide fiber of claim 1 wherein the respective length portions of said waveguide fiber have respective lengths $l_i$ and said waveguide fiber is characterized by n total dispersion products $l_i \times D_i$ and n total dispersion slope products $l_i \times S_i$, and the end to end total dispersion has a magnitude that has a range +/−10 ps/nm and the end to end total dispersion slope has a magnitude that has a range +/−10 ps/nm².

5. The dispersion controlled waveguide fiber of claim 4 wherein the end to end total dispersion has a magnitude that has a range +/−5 ps/nm and the end to end total dispersion slope has a magnitude that has a range +/−5 ps/nm².

6. The dispersion controlled waveguide fiber of claim 1 wherein the refractive index profile of the length portions comprises four segments, a central segment having a relative refractive index percent $\Delta_0\%$ and a radius $r_0$, a first annular segment surrounding the central segment having a relative refractive index percent $\Delta_1\%$ and a radius $r_1$, a second annular segment surrounding the first annular segment having a relative refractive index percent $\Delta_2\%$ and a radius $r_2$, a third annular segment surrounding the second annular segment having a relative refractive index percent $\Delta_3\%$ and a radius $r_3$, wherein, $(\Delta_0\%$ and $\Delta_3\%)>\Delta_2\%>\Delta_1\%$ and $\Delta_1\%$ is negative, and, at 1550 nm, the effective area is greater than about 40 μm, the mode field diameter is greater than 7.0 μm, and the pin array bend loss is less than or equal to 12 dB.

7. The dispersion controlled waveguide fiber of claim 6 wherein $0.50\% \leq \Delta_0\% \leq 1.0\%$, $-0.55\% \leq \Delta_1\% \leq -0.1\%$, $-0.1 \leq \Delta_2\% \leq 0.1\%$, $0.1\% \leq \Delta_3\% \leq 0.7\%$, 2.5 μm$\leq r_0 \leq$5.0 μm, 4.0 μm$\leq r_1 \leq$7.0 μm, 4.0 μm$\leq r_2 \leq$9.0 μm, and, 5.0 μm$\leq r_3 \leq$10.0 μm.

8. The dispersion controlled waveguide fiber of claim 1 wherein the refractive index profile of the length portions comprises five segments, a central segment having a relative refractive index percent $\Delta_0\%$ and a radius $r_0$, a first annular segment surrounding the central segment having a relative refractive index percent $\Delta_1\%$ and a radius $r_1$, a second annular segment surrounding the first annular segment having a relative refractive index percent $\Delta_2\%$ and a radius $r_2$, a third annular segment surrounding the second annular segment having a relative refractive index percent $\Delta_3\%$ and a radius $r_3$, a fourth annular segment surrounding the third annular segment having a relative refractive index percent $\Delta_4\%$ and a radius $r_4$, wherein, $\Delta_1\%>\Delta_4\%>(\Delta_0\%$ and $\Delta_3\%)>\Delta_2\%$ and $\Delta_2\%$ is negative, and, at 1550 nm, the effective area is greater than about 40 μm, the mode field diameter is greater than 7.0 μm, and the pin array bend loss is less than or equal to 12 dB.

9. The dispersion controlled waveguide fiber of claim 8 wherein $-0.20\% \leq \Delta_0\% \leq 0.50\%$, $0.50\% \leq \Delta_1\% \leq 1.0\%$, $-0.55 \leq \Delta_2\% \leq -0.10\%$, $-0.10\% \leq \Delta_3\% \leq 0.1\%$, $0.10\% \leq \Delta_4\% \leq 0.70\%$, 0.50 μm$\leq r_0 \leq$2.0 μm, 2.5 μm$\leq r_1 \leq$4.0 μm, 5.0 μm$\leq r_2 \leq$7.0 μm, 6.0 μm$\leq r_3 \leq$8.0 μm, and 7.0 μm$\leq r_4 \leq$10.0 μm.

10. The dispersion controlled waveguide fiber of claim 1 wherein the sign of total dispersion is opposition the sign of total dispersion slope for each length portion.

11. The dispersion controlled waveguide fiber of claim 10 wherein the refractive index profile of length portions for which the total dispersion is positive and the total dispersion slope is negative comprises three segments, a central segment having a relative refractive index percent $\Delta_0\%$ and a radius $r_0$, a first annular segment surrounding the central segment having a relative refractive index percent $\Delta_1\%$ and a radius $r_1$, and a second annular segment surrounding the first annular segment having a relative refractive index percent $\Delta_2\%$ and a radius $r_2$, wherein, $\Delta_0\%>\Delta_2\%>\Delta_1\%$ and $\Delta_1\%$ is negative, and, at 1550 nm, the effective area is greater than about 25 μm, the mode field diameter is greater than 6 μm, and the pin array bend loss is less than or equal to 12 dB.

12. The dispersion controlled waveguide fiber of claim 11 wherein $0.6\% \leq \Delta_0\% \leq 0.8\%$, $-0.5\% \leq \Delta_1\% \leq -0.4\%$, $0.4\% \leq \Delta_2\% \leq 0.6\%$, 2.5 μm$\leq r_0 \leq$3.5 μm, 6.5 μm$\leq r_1 \leq$7.5μm, and 7.5 μm$\leq r_2 \leq$8.5 μm.

13. The dispersion controlled waveguide fiber of claim 10 wherein the refractive index profile of length portions for which the total dispersion is negative and the total dispersion slope is positive comprises four segments, a central segment having a relative refractive index percent $\Delta_0\%$ and a radius $r_0$, a first annular segment surrounding the central segment having a relative refractive index percent $\Delta_1\%$ and a radius $r_1$, a second annular segment surrounding the first annular segment having a relative refractive index percent $\Delta_2\%$ and a radius $r_2$, a third annular segment surrounding the second annular segment having a relative refractive index percent $\Delta_3\%$ and a radius $r_3$, wherein, $\Delta_0\%>\Delta_3\%>\Delta_2\%>\Delta_1\%$ and $\Delta_1\%$ is negative, and, at 1550 nm, the effective area is greater than about 40 μm, the mode field diameter is greater than 7.0 μm, and the pin array bend loss is less than or equal to 12 dB.

14. The dispersion controlled waveguide fiber of claim 13 wherein $0.55\% \leq \Delta_0\% \leq 0.65\%$, $-0.15\% \leq \Delta_1\% \leq -0.05\%$, $0 \leq \Delta_2\% \leq 0.1\%$, $0.2\% \leq \Delta_3\% \leq 0.3\%$, 2.5 μm$\leq r_0 \leq$3.5 μm, 5.5 μm$\leq r_1 \leq$6.5 μm, 6.5 μm$\leq r_2 \leq$8.0 μm, 9.0 μm$\leq r_3 \leq$10.0 μm.

15. The dispersion controlled waveguide fiber of claim 10 wherein the refractive index profile of length portions for which the total dispersion is negative and the total dispersion slope is positive comprises four segments, a central segment having a relative refractive index percent $\Delta_0\%$ and a radius $r_0$, a first annular segment surrounding the central segment having a relative refractive index percent $\Delta_1\%$ and a radius $r_1$, a second annular segment surrounding the first annular segment having a relative refractive index percent $\Delta_2\%$ and a radius $r_2$, a third annular segment surrounding the second annular segment having a relative refractive index percent $\Delta_3\%$ and a radius $r_3$, wherein, $(\Delta_0\%$ and $\Delta_3\%)>\Delta_2\%>\Delta_1\%$ and $\Delta_1\%$ is negative, and, at 1550 nm, the effective area is greater than about 40 $\mu$m, the mode field diameter is greater than 7.0 $\mu$m, and the pin array bend loss is less than or equal to 12 dB.

16. The dispersion controlled waveguide fiber of claim 15 wherein $0.55\%\leq\Delta_0\%\leq0.65\%$, $-0.35\%\leq\Delta_1\%\leq-0.25\%$, $0\leq\Delta_2\%\leq0.1\%$, $0.6\%\leq\Delta_3\%\leq0.7\%$, 3.0 $\mu$m$\leq r_0\leq$3.8 $\mu$m, 5.0 $\mu$m$\leq r_1\leq$6.0 $\mu$m, 6.0 $\mu$m$\leq r_2\leq$7.0 $\mu$m, 7.5 $\mu$m$\leq r_3\leq$8.5 $\mu$m.

17. The dispersion controlled waveguide fiber of claim 1 wherein the refractive index profile of length portions for which the total dispersion is negative and the total dispersion slope is positive comprises five segments, a central segment having a relative refractive index percent $\Delta_0\%$ and a radius $r_0$, a first annular segment surrounding the central segment having a relative refractive index percent $\Delta_1\%$ and a radius $r_1$, a second annular segment surrounding the first annular segment having a relative refractive index percent $\Delta_2\%$ and a radius $r_2$, a third annular segment surrounding the second annular segment having a relative refractive index percent $\Delta_3\%$ and a radius $r_3$, a fourth annular segment surrounding the third annular segment having a relative refractive index percent $\Delta_4\%$ and a radius $r_4$, wherein, $\Delta_1\%>\Delta_4\%>(\Delta_0\%$ and $\Delta_3\%)>\Delta_2\%$ and $\Delta_2\%$ is negative, and, at 1550 nm, the effective area is greater than about 40 $\mu$m, the mode field diameter is greater than 7.0 $\mu$m, and the pin array bend loss is less than or equal to 12 dB.

18. The dispersion controlled waveguide fiber of claim 17 wherein $-0.10\%\leq\Delta_0\%\leq0.30\%$, $0.60\%\leq\Delta_1\%\leq1.0\%$, $-0.50\leq\Delta_2\%\leq-0.20\%$, $0\leq\Delta_3\%\leq0.1\%$, $0.30\%\leq\Delta_4\%\leq0.50\%$, 0.50 $\mu$m$\leq r_0\leq$1.6 $\mu$m, 2.5 $\mu$m$\leq r_1\leq$3.5 $\mu$m, 5.2 $\mu$m$\leq r_2\leq$6.0 $\mu$m, 6.0 $\mu$m $r_3\leq$6.5 $\mu$m, and 7.4 $\mu$m$\leq r_4\leq$8.3 $\mu$m.

19. The dispersion controlled waveguide fiber of claim 1 further comprising length portions having refractive index profiles chosen to provide a positive total dispersion and a positive total dispersion slope.

20. The dispersion controlled waveguide fiber of claim 19 wherein the refractive index profile of length portions for which the total dispersion is positive and the total dispersion slope is positive comprises three segments, a central segment having a relative refractive index percent $\Delta_0\%$ and a radius $r_0$, a first annular segment surrounding the central segment having a relative refractive index percent $\Delta_1\%$ and a radius $r_1$, and a second annular segment surrounding the first annular segment having a relative refractive index percent $\Delta_2\%$ and a radius $r_2$, wherein, $(\Delta_0\%$ and $\Delta_2\%)>\Delta_1\%$ and $\Delta_1\%$ is negative, and, at 1550 nm, the effective area is greater than about 40 $\mu$m, the mode field diameter is greater than 7 $\mu$m, and the pin array bend loss is less than or equal to 12 dB.

21. The dispersion controlled waveguide fiber of claim 20 wherein $0.6\%\leq\Delta_0\%\leq0.8\%$, $-0.5\%\leq\Delta_1\%\leq-0.4\%$, $0.4\%\leq\Delta_2\%\leq0.6\%$, 3.5 $\mu$m$\leq r_0\leq$4.2 $\mu$m, 5.8 $\mu$m$\leq r_1\leq$6.5 $\mu$m, and 6.5 $\mu$m$\leq r_2\leq$8.0 $\mu$m.

22. The dispersion controlled waveguide fiber of claim 19 wherein the refractive index profile of length portions for which the total dispersion is positive and the total dispersion slope is positive comprises four segments, a central segment having a relative refractive index percent $\Delta_0\%$ and a radius $r_0$, a first annular segment surrounding the central segment having a relative refractive index percent $\Delta_1\%$ and a radius $r_1$, a second annular segment surrounding the first annular segment having a relative refractive index percent $\Delta_2\%$ and a radius $r_2$, a third annular segment surrounding the second annular segment having a relative refractive index percent $\Delta_3\%$ and a radius $r_3$, wherein, $(\Delta_0\%$ and $\Delta_3\%)>\Delta_2\%>\Delta_1\%$ and $\Delta_1\%$ is negative, and, at 1550 nm, the effective area is greater than about 40 $\mu$m, the mode field diameter is greater than 7.0 $\mu$m, and the pin array bend loss is less than or equal to 12 dB.

23. The dispersion controlled fiber of claim 22 wherein $0.48\%\leq\Delta_0\%\leq0.58\%$, $-0.15\%\leq\Delta_1\%\leq-0.21\%$, $0\leq\Delta_2\%\leq0.1\%$, $0.48\%\leq\Delta_3\%\leq0.58\%$, 3.0 $\mu$m$\leq r_0\leq$4.0 $\mu$m, 7.5 $\mu$m$\leq r_1\leq$8.0 $\mu$m, 7.9 $\mu$m$\leq r_2\leq$8.5 $\mu$m, 8.8 $\mu$m$\leq r_3\leq$9.5 $\mu$m.

24. The dispersion controlled waveguide fiber of claim 19 wherein the refractive index profile of length portions for which the total dispersion is positive and the total dispersion slope is positive comprises five segments, a central segment having a relative refractive index percent $\Delta_0\%$ and a radius $r_0$, a first annular segment surrounding the central segment having a relative refractive index percent $\Delta_1\%$ and a radius $r_1$, a second annular segment surrounding the first annular segment having a relative refractive index percent $\Delta_2\%$ and a radius $r_2$, a third annular segment surrounding the second annular segment having a relative refractive index percent $\Delta_3\%$ and a radius $r_3$, a fourth annular segment surrounding the third annular segment having a relative refractive index percent $\Delta_4\%$ and a radius $r_4$, wherein, $\Delta_1\%>\Delta_4\%>(\Delta_0\%$ and $\Delta_3\%)>\Delta_2\%$ and $\Delta_2\%$ is negative, and, at 1550 nm, the effective area is greater than about 40 $\mu$m, the mode field diameter is greater than 7.0 $\mu$m, and the pin array bend loss is less than or equal to 12 dB.

25. The dispersion controlled waveguide fiber of claim 24 wherein $0.04\%\leq\Delta_0\%\leq0.14\%$, $0.70\%\leq\Delta_1\%\leq0.82\%$, $-0.32\leq\Delta_2\%\leq-0.25\%$, $0\leq\Delta_3\%\leq0.1\%$, $0.44\%\leq\Delta_4\%\leq0.52\%$, 1.40 $\mu$m$\leq r_0\leq$2.2 $\mu$m, 2.8 $\mu$m$\leq r_1\leq$3.6 $\mu$m, 6.8 $\mu$m$\leq r_2\leq$7.6 $\mu$m, 7.6 $\mu$m$\leq r_3\leq$8.4 $\mu$m, and 8.7 $\mu$m$\leq r_4\leq$9.5 $\mu$m.

26. A telecommunication system comprising optical waveguide fiber made in accord with any one of claims 1, 10, or 19.

* * * * *

UNITED STATES PATENT AND TRADEMARK OFFICE
CERTIFICATE OF CORRECTION

PATENT NO. : 6,760,525 B2 Page 1 of 1
DATED : July 6, 2004
INVENTOR(S) : Srikant V. et al.

It is certified that error appears in the above-identified patent and that said Letters Patent is hereby corrected as shown below:

Column 13,
Line 36, "$\mu m \leq r_1 \leq 3.5\ \mu m,\ 5.2\ \mu m \leq r_2 \leq 6.0\ \mu m,\ 6.0\ \mu m\ r_3 \leq 6.5\ \mu m,$" should be
-- $\mu m \leq r_1 \leq 3.5\ \mu m,\ 5.2\ \mu m \leq r_2 \leq 6.0\ \mu m,\ 6.0\ \mu m \leq r_3 \leq 6.5\ \mu m,$ --

Signed and Sealed this

Sixteenth Day of November, 2004

JON W. DUDAS
*Director of the United States Patent and Trademark Office*